United States Patent
Whitcomb

(10) Patent No.: US 8,815,151 B2
(45) Date of Patent: Aug. 26, 2014

(54) METAL ION CATALYSIS OF METAL ION REDUCTION, METHODS, COMPOSITIONS, AND ARTICLES

(75) Inventor: David R. Whitcomb, Woodbury, MN (US)

(73) Assignee: Carestream Health, Inc., Rochester, NY (US)

( * ) Notice: Subject to any disclaimer, the term of this patent is extended or adjusted under 35 U.S.C. 154(b) by 106 days.

(21) Appl. No.: 13/453,103

(22) Filed: Apr. 23, 2012

(65) Prior Publication Data

US 2012/0301353 A1 Nov. 29, 2012

Related U.S. Application Data

(60) Provisional application No. 61/488,837, filed on May 23, 2011.

(51) Int. Cl.
*C22C 5/06* (2006.01)
*C22C 1/00* (2006.01)

(52) U.S. Cl.
USPC .............. 420/591; 75/711; 75/392; 75/343; 75/351; 977/896; 977/762

(58) Field of Classification Search
USPC .............. 420/591; 977/896, 762; 75/343, 351
See application file for complete search history.

(56) References Cited

U.S. PATENT DOCUMENTS

2006/0083694 A1* 4/2006 Kodas et al. .................... 424/46
2009/0196788 A1* 8/2009 Wang et al. ..................... 420/501

FOREIGN PATENT DOCUMENTS

| EP | 0 977 212 A2 | 2/2000 |
| JP | 2009-155674 | 7/2009 |
| JP | 2011-032504 | 2/2011 |
| WO | WO2010/136619 | 12/2010 |

OTHER PUBLICATIONS

Younan Xia, et al., Shape-Controlled Synthesis of Metal Nanocrystals: Simple Chemistry Meets Complex Physics?, Angew. Chem. Int. Ed. 2009, 48, pp. 60-103.
B. Wiley et al., Polyol synthesis of silver nanoparticles: Use of chloride and oxygen to promote the formation of single-crystal, truncated cubes and tetrahedrons, vol. 4, Issue 9, pp. 1733-1739, Sep. 2004.
Kylee Korte et al., Rapid synthesis of silver nanowires through a CuCl- or $CuCl_2$-mediated polyol process, Journal of Materials Chemistry, 2008, vol. 18, pp. 437-441.
Jinting Jiu, et al., Preparation of Ag nanorods with high yield by polyol process, Mat. Chem. & Phys., 2009, 114, pp. 333-338.
Srichandana Nandikonda, Microwave Assisted Synthesis of Silver Nanorods, M.S. Thesis, Auburn University, Aug. 9, 2010, 59 pages.
Shanthi Muralli et al., Lyotropic liquid crystalline self-assembly in dispersions of silver nanowires and nanoparticles, vol. 26, Issue 13, pp. 11176-11183.
Z.C. Li, Sodium chloride assisted synthesis of silver nanowires, IET Micro & Nano Letters, vol. 6, Issue 2, pp. 90-93, Feb. 2011.

(Continued)

*Primary Examiner* — Rebecca Lee
(74) *Attorney, Agent, or Firm* — Reed L. Christiansen

(57) ABSTRACT

Nanowire preparation methods, compositions, and articles are disclosed. Such methods which reduce metal ions to metal nanowires in the presence complexes comprising metal-metal bonds, are capable of producing long, narrow, nanowires useful for electronics and optical applications.

7 Claims, 1 Drawing Sheet

(56) References Cited

OTHER PUBLICATIONS

Benjamin Wiley et al., Polyol Synthesis of Silver Nanostructures: Control of Product Morphology with Fe(II) or Fe(III) Species, Langmuir, The ACS Journal of Surfaces and Colloids, Aug. 2005, vol. 21, No. 18, pp. 8077-8080.

M. H. Chisholm et al., A General Synthesis for Ditungsten Tetracarboxylates, Preparation of W-W Quadruple Bonds by Reductive-Elimination (Alkyl Group Disproportionation) From 1,2-Diethyl Compounds With W-W Triple Bonds, Polyhedron, vol. 3, No. 6, pp. 759-760, 1984.

International Search Report, International application No. PCT/US2012/034876, Dated Oct. 24, 2012, 2 pages.

\* cited by examiner

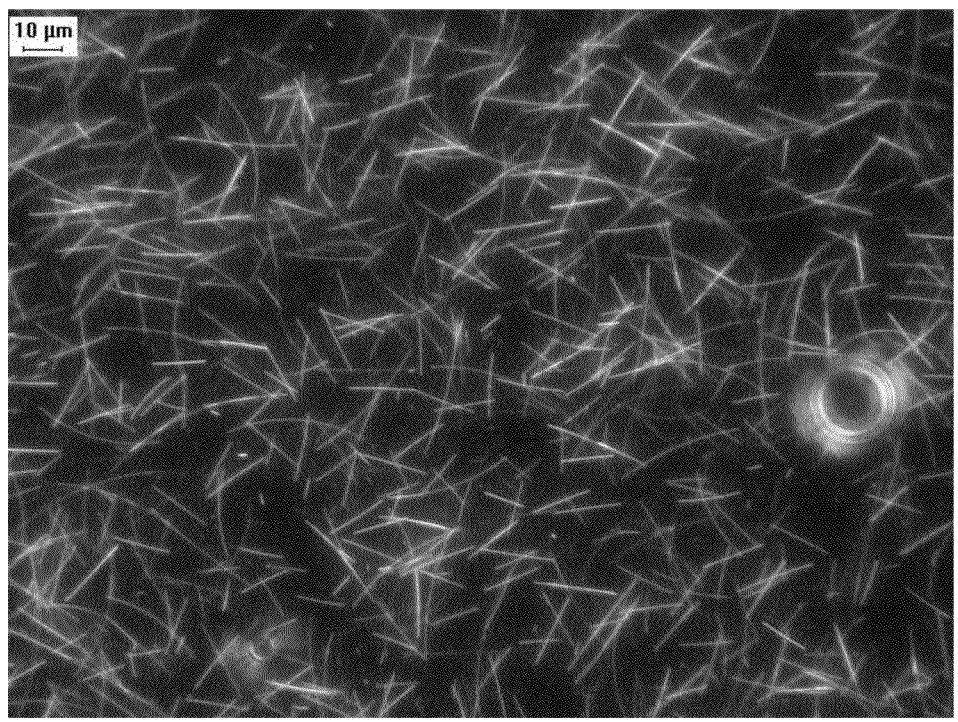

METAL ION CATALYSIS OF METAL ION REDUCTION, METHODS, COMPOSITIONS, AND ARTICLES

CROSS REFERENCE TO RELATED APPLICATIONS

This application claims the benefit of U.S. provisional application No. 61/488,837, filed May 23, 2011, entitled METAL ION CATALYSIS OF METAL ION REDUCTION, METHODS, COMPOSITIONS, AND ARTICLES, which is hereby incorporated by reference in its entirety.

BACKGROUND

The general preparation of silver nanowires (10-200 aspect ratio) is known. See, for example, *Angew. Chem. Int. Ed.* 2009, 48, 60, Y. Xia, Y. Xiong, B. Lim, S. E. Skrabalak, which is hereby incorporated by reference in its entirety. Such preparations typically employ $Fe^{2+}$ or $Cu^{2+}$ ions to "catalyze" the wire formation over other morphologies. The controlled preparation of silver nanowires having the desired lengths and widths, however, is not known. For example, the $Fe^{2+}$ produces a wide variety of lengths or thicknesses and the $Cu^{2+}$ produces wires that are too thick for many applications.

When iron or copper are used, they are typically provided as the metal halide salts $FeCl_2$ or $CuCl_2$. See, for example, B. Wiley et al., *Nano Letters*, 2004, 4, 1733-1739 and K. E. Korte et al., *J. Mats. Chem.*, 2008, 18, 437. Other metal halide salts have been used in nanowire synthesis. See, for example, J. Jiu, K. Murai, D. Kim, K. Kim, K. Suganuma, *Mat. Chem. & Phys.*, 2009, 114, 333, which refers to NaCl, $CoCl_2$, $CuCl_2$, $NiCl_2$ and $ZnCl_2$, and S. Nandikonda, "Microwave Assisted Synthesis of Silver Nanorods," M. S. Thesis, Auburn University, Auburn, Ala., USA, Aug. 9, 2010, which refers to NaCl, KCl, $MgCl_2$, $CaCl_2$, $MnCl_2$, $CuCl_2$, and $FeCl_3$, and Japanese patent application publication 2009-155674, which discloses $SnCl_4$. See also S. Murali et al., *Langmuir*, 2010, 26(13), 11176-83; Z. C. Li et al., *Micro & Nano Letters*, 2011, 6(2), 90-93; and B. J. Wiley et al., *Langmuir*, 2005, 21, 8077. Japanese patent application publication 2009-155674 discloses $SnCl_4$.

SUMMARY

At least a first embodiment comprises methods comprising providing a composition comprising at least one first compound comprising at least one first reducible metal ion; and at least one second compound comprising at least a second metal atom and at least a third metal atom, said at least one second metal atom being bonded to the at least one third metal atom by at least one metal-to-metal bond; and reducing the at least reducing the at least one first reducible metal ion to at least one first metal nanowire. In at least some cases, the composition may further comprise at least one solvent.

In at least some embodiments, the at least one first reducible metal ion comprises at least one coinage metal ion or at least one ion of an element from IUPAC Group 11 or at least one silver ion.

In at least some cases, the at least one second metal atom comprises molybdenum, or the at least one third metal atom comprises molybdenum, or both.

In at least some embodiments, the at least one metal-to-metal bond comprises one or more of at least one triple bond or at least one quadruple bond, or the at least one metal-to-metal bond comprises at least one quadruple bond.

In at least some cases, the at least one second compound comprises at least one complex comprising the at least one second metal atom and the at least one third metal atom, the at least one complex further comprising at least one carbon atom bonded to the at least one second metal atom or the at least one third metal atom. An exemplary second compound is $(Mo(OCOCH_3)_2)_2$.

Other embodiments provide the at least one first metal nanowire produced according to such methods.

At least a second embodiment provides methods comprising providing a composition comprising at least one compound comprising at least one first reducible metal ion; at least one second compound comprising at least a second metal atom and at least a third metal atom, where the at least one second metal atom is bonded to the at least one third metal atom by at least one metal-to-metal bond, and at least one solvent; and reducing the at least one first reducible metal ion to at least one first metal. The at least one first metal ion may, for example, comprise at least one element from IUPAC Group 11, or at least one coinage metal ion, or at least one silver ion. The at least one second metal atom, or the at least one third metal atom, or both, may, for example, comprise molybdenum. The at least one metal-to-metal bond may, in some embodiments, comprise one or more of at least one double bond, or at least one triple bond, or at least one quadruple bond. Or the at least one metal-to-metal bond may, in other embodiments, comprise one or more of at least one triple bond or at least one quadruple bond. Or the at least one metal-to-metal bond may, in still other embodiments, comprise at least one quadruple bond. The at least one second compound may, in some cases, comprise at least one complex comprising the at least one second metal atom and the at least one third metal atom, where the at least one complex further comprises at least one carbon atom bonded to the at least one second metal atom or the at least one third metal atom, or, in other cases, the at least one complex further comprises at least one first carbon atom bonded to the at least one second metal atom and at least one second carbon atom bonded to the at least one third metal atom. The at least one second compound may, for example, comprise $(Mo(OCOCH_3)_2)_2$. In at least some embodiments, the at least one solvent may comprise at least one polyol. In other embodiments, the at least one solvent may comprise at least one of ethylene glycol, propylene glycol, glycerol, one or more sugars, or one or more carbohydrates. In some cases, the composition has a ratio of the total moles of the at least one second metal atom to the total moles of the at least one first reducible metal ion from about 0.0001 to about 0.1, and, optionally, the composition may further have a ratio of the total moles of the at least one third metal atom to the total moles of the at least one first reducible metal ion from about 0.0001 to about 0.1. The reduction may, for example, be carried out at one or more temperatures from about 120° C. to about 190° C. In at least some such embodiments, the composition may further comprise at least one protecting agent, such as, for example, polyvinylpyrrolidinone.

Other embodiments provide the at least one first metal produced according to such methods.

Still other embodiments provide at least one article comprising the at least one first metal produced according to such methods. Such articles may, for example, comprise at least one first metal comprising one or more nanowires, nanocubes, nanorods, nanopyramids, nanotubes, or the like. Or such articles may, for example, comprise at least one first metal comprising objects having an average diameter of between about 10 nm and about 500 nm, or an aspect ratio from about 50 to about 10,000.

These embodiments and other variations and modifications may be better understood from the brief description of figure, description, exemplary embodiments, example, figure, and claims that follow. Other desirable objectives and advantages inherently achieved may occur or become apparent to those skilled in the art. The invention is defined by the appended claims.

BRIEF DESCRIPTION OF FIGURE

FIG. 1 shows an optical micrograph of the silver nanowire product of Example 1.

DESCRIPTION

All publications, patents, and patent documents referred to in this document are incorporated by reference herein in their entirety, as though individually incorporated by reference.

U.S. provisional application No. 61/488,837, filed May 23, 2011, entitled METAL ION CATALYSIS OF METAL ION REDUCTION, METHODS, COMPOSITIONS, AND ARTICLES, is hereby incorporated by reference in its entirety.

Reducible Metal Ions and Metal Products

Some embodiments provide methods comprising reducing at least one reducible metal ion to at least one metal. A reducible metal ion is a cation that is capable of being reduced to a metal under some set of reaction conditions. In such methods, the at least one first reducible metal ion may, for example, comprise at least one coinage metal ion. A coinage metal ion is an ion of one of the coinage metals, which include copper, silver, and gold. Or such a reducible metal ion may, for example, comprise at least one ion of an IUPAC Group 11 element. IUPAC Group 11 elements are sometimes referred to as Group IB elements, based on historic nomenclature. An exemplary reducible metal ion is a silver cation. Such reducible metal ions may, in some cases, be provided as salts. For example, silver cations might, for example, be provided as silver nitrate.

In such embodiments, the at least one metal is that metal to which the at least one reducible metal ion is capable of being reduced. For example, silver would be the metal to which a silver cation would be capable of being reduced.

Nanostructures, Nanostructures, and Nanowires

In some embodiments, the metal product formed by such methods is a nanostructure, such as, for example, a one-dimensional nanostructure. Nanostructures are structures having at least one "nanoscale" dimension less than 300 nm, and at least one other dimension being much larger than the nanoscale dimension, such as, for example, at least about 10 or at least about 100 or at least about 200 or at least about 1000 times larger. Examples of such nanostructures are nanorods, nanowires, nanotubes, nanopyramids, nanoprisms, nanoplates, and the like. "One-dimensional" nanostructures have one dimension that is much larger than the other two dimensions, such as, for example, at least about 10 or at least about 100 or at least about 200 or at least about 1000 times larger.

Such one-dimensional nanostructures may, in some cases, comprise nanowires. Nanowires are one-dimensional nanostructures in which the two short dimensions (the thickness dimensions) are less than 300 nm, preferably less than 100 nm, while the third dimension (the length dimension) is greater than 1 micron, preferably greater than 10 microns, and the aspect ratio (ratio of the length dimension to the larger of the two thickness dimensions) is greater than five. Nanowires are being employed as conductors in electronic devices or as elements in optical devices, among other possible uses. Silver nanowires are preferred in some such applications.

Such methods may be used to prepare nanostructures other than nanowires, such as, for example, nanocubes, nanorods, nanopyramids, nanotubes, and the like. Nanowires and other nanostructure products may be incorporated into articles, such as, for example, electronic displays, touch screens, portable telephones, cellular telephones, computer displays, laptop computers, tablet computers, point-of-purchase kiosks, music players, televisions, electronic games, electronic book readers, transparent electrodes, solar cells, light emitting diodes, other electronic devices, medical imaging devices, medical imaging media, and the like.

Preparation Methods

A common method of preparing nanostructures, such as, for example, nanowires, is the "polyol" process. Such a process is described in, for example, *Angew. Chem. Int. Ed.* 2009, 48, 60, Y. Xia, Y. Xiong, B. Lim, S. E. Skrabalak, which is hereby incorporated by reference in its entirety. Such processes typically reduce a metal cation, such as, for example, a silver cation, to the desired metal nanostructure product, such as, for example, a silver nanowire. Such a reduction may be carried out in a reaction mixture that may, for example, comprise one or more polyols, such as, for example, ethylene glycol (EG), propylene glycol, butanediol, glycerol, sugars, carbohydrates, and the like; one or more protecting agents, such as, for example, polyvinylpyrrolidinone (also known as polyvinylpyrrolidone or PVP), other polar polymers or copolymers, surfactants, acids, and the like; and one or more metal ions. These and other components may be used in such reaction mixtures, as is known in the art. The reduction may, for example, be carried out at one or more temperatures from about 90° C. to about 190° C.

Complexes Having Metal-Metal Bonds

The Applicant has recognized that molybdenum, as $Mo^{2+}$ in a complex having a metal-metal quadruple bond can be used to prepare silver nanowires. An example of such a complex is $(Mo(OCOCH_3)_2)_2$. Such complexes are described in M. H. Chisholm, H. T. Chiu, J. C. Huffman, *Polyhedron*, 1984, 3, 759, which is incorporated by reference in its entirety.

Other metal-metal bonded complexes that include metal-metal double bonds, triple bonds, or quadruple bonds, are thought to be useful in this application. Moreover, metal ions in other oxidation states, such as +3 or +4, such as, for example, $Mo^{3+}$ or $Mo^{4+}$, are also expected to be useful in this application.

These methods are also believed to be applicable to reducible metal cations other than silver cations, including, for example, reducible cations of other IUPAC Group 11 elements, reducible cations of other coinage metals, and the like. The method may also be used to prepare products other than nanowires, such as, for example, nanocubes, nanorods, nanopyramids, nanotubes, and the like. Such products may be incorporated into articles, such as, for example, transparent electrodes, solar cells, light emitting diodes, other electronic devices, medical imaging devices, medical imaging media, and the like.

EXEMPLARY EMBODIMENTS

U.S. provisional application No. 61/488,837, filed May 23, 2011, entitled METAL ION CATALYSIS OF METAL ION REDUCTION, METHODS, COMPOSITIONS, AND ARTICLES, which is hereby incorporated by reference in its entirety, disclosed the following 23 non-limiting exemplary embodiments:

A. A method comprising:
  providing a composition comprising:
    at least one first compound comprising at least one first reducible metal ion;
    at least one second compound comprising at least a second metal atom and at least a third metal atom, said at least one second metal atom being bonded to the at least one third metal atom by at least one metal-to-metal bond; and
    at least one solvent; and
  reducing the at least one first reducible metal ion to at least one first metal.
B. The method of embodiment A, wherein the composition further comprises at least one protecting agent.
C. The method of embodiment A, wherein the at least one first reducible metal ion comprises at least one coinage metal ion.
D. The method of embodiment A, wherein the at least one first reducible metal ion comprises at least one ion of an element from IUPAC Group 11.
E. The method of embodiment A, wherein the at least one first reducible metal ion comprises at least one ion of silver.
F. The method of embodiment A, wherein the at least one first compound comprises silver nitrate.
G. The method of embodiment A, wherein the at least one second metal atom comprises molybdenum.
H. The method of embodiment G, wherein the at least one third metal atom comprises molybdenum.
J. The method of embodiment A, wherein the at least one metal-to-metal bond comprises one or more of at least one double bond, at least one triple bond, or at least one quadruple bond.
K. The method of embodiment A, wherein the at least one metal-to-metal bond comprises one or more of at least one triple bond or at least one quadruple bond.
L. The method of embodiment A, wherein the at least one metal-to-metal bond comprises at least one quadruple bond.
M. The method of embodiment A, wherein the at least one second compound comprises at least one complex comprising the at least one second metal atom and the at least one third metal atom, said at least one complex further comprising at least one carbon atom bonded to the at least one second metal atom or the at least one third metal atom.
N. The method of embodiment A, wherein the at least one second compound comprises at least one complex comprising the at least one second metal atom and the at least one third metal atom, said at least one complex further comprising at least one first carbon atom bonded to the at least one second metal atom and at least one second carbon atom bonded to the at least one third metal atom.
P. The method of embodiment A, wherein the at least one second compound comprises $(Mo(OCOCH_3)_2)_2$.
Q. The method of embodiment A, wherein the at least one solvent comprises at least one polyol.
R. The method of embodiment A, wherein the at least one solvent comprises at least one of: ethylene glycol, propylene glycol, glycerol, one or more sugars, or one or more carbohydrates.
S. The method of embodiment A, wherein the composition has a ratio of the total moles of the at least one second metal atom to the total moles of the at least one first reducible metal ion from about 0.0001 to about 0.1.
T. The method of embodiment S, further wherein the composition has a ratio of the total moles of the at least one third metal atom to the total moles of the at least one first reducible metal ion from about 0.0001 to about 0.1.
U. The method of embodiment A, wherein the reduction is carried out at one or more temperatures from about 120° C. to about 190° C.
V. The at least one first metal produced according to the method of embodiment A.
W. At least one article comprising the at least one first metal produced according to the method of embodiment A.
X. The at least one article of embodiment W, wherein the at least one first metal comprises one or more nanowires, nanocubes, nanorods, nanopyramids, or nanotubes.
Y. The at least one article of embodiment W, wherein the at least one first metal comprises at least one object having an average diameter of between about 10 nm and about 500 nm.

EXAMPLE

Example 1

To a 500 mL reaction flask containing 280 mL ethylene glycol (EG), 2.0 g of a 5.1 mM solution of $(Mo(OCOCH_3)_2)_2$ in ethylene glycol (EG) and 0.15 g of a 1.3 mM solution of NaCl in EG were added. This solution was stripped of at least some dissolved gases by bubbling $N_2$ into the solution for at 2 hrs using a glass pipette at room temperature with mechanical stirring while at 100 rpm. (This operation will be referred to as "degassing" the solution in the sequel.) Solutions of polyvinylpyrrolidinone (PVP), 0.77 M in EG, and $AgNO_3$, 0.25 M in EG, were also degassed with nitrogen for 60 min, then 20 mL syringes of each were prepared. The reaction mixture was heated to 145° C. under nitrogen and the $AgNO_3$ and PVP solutions were added at a constant rate over 25 minutes via a 12 gauge Teflon syringe needle. The reaction mixture was held at 145° C. for 90 minutes then allowed to cool to ambient temperature. FIG. 1 shows an optical micrograph of the product sample.

The invention has been described in detail with particular reference to a presently preferred embodiment, but it will be understood that variations and modifications can be effected within the spirit and scope of the invention. The presently disclosed embodiments are therefore considered in all respects to be illustrative and not restrictive. The scope of the invention is indicated by the appended claims, and all changes that come within the meaning and range of equivalents thereof are intended to be embraced therein.

What is claimed:

1. A method comprising:
  providing a composition comprising:
    at least one first compound comprising at least one first reducible metal ion, the at least one first reducible metal ion comprising at least one coinage metal ion or at least one ion of an element from IUPAC Group 11 or at least one silver ion; and
    at least one second compound comprising at least a second metal atom comprising molybdenum and at least a third metal atom, said at least one second metal atom being bonded to the at least one third metal atom by at least one metal-to-metal bond; and
  reducing the at least one first reducible metal ion to at least one first metal nanowire.

2. The method according to claim 1, wherein the composition further comprises at least one solvent.

3. The method of claim 1, wherein the at least one third metal atom comprises molybdenum.

4. The method of claim 1, wherein the at least one metal-to-metal bond comprises one or more of at least one triple bond or at least one quadruple bond.

5. The method of claim 1, wherein the at least one metal-to-metal bond comprises at least one quadruple bond.

6. The method of claim 1, wherein the at least one second compound comprises at least one complex comprising the at least one second metal atom and the at least one third metal atom, said at least one complex further comprising at least one carbon atom bonded to the at least one second metal atom or the at least one third metal atom.

7. The method of claim 1, wherein the at least one second compound comprises $(Mo(OCOCH_3)_2)_2$.

* * * * *